United States Patent
Stacey

[15] 3,662,783
[45] May 16, 1972

[54] SPOOL VALVE ASSEMBLY
[72] Inventor: Hugh J. Stacey, Willoughby, Ohio
[73] Assignee: Parker-Hannifin Corporation, Cleveland, Ohio
[22] Filed: Feb. 2, 1970
[21] Appl. No.: 7,836

[52] U.S. Cl. ..................... 137/596.14, 137/454.5, 285/137, 151/66, 287/79, 287/104
[51] Int. Cl. .......................................... F16k 11/07
[58] Field of Search ............... 137/454.5, 492, 612.1, 636.1, 137/625.6, 625.64, 596.14, 596.2, 538; 285/137; 287/58, 79, 104

[56] References Cited

UNITED STATES PATENTS

| | | | |
|---|---|---|---|
| 1,603,375 | 10/1926 | Clowes | 287/79 X |
| 2,240,488 | 5/1941 | Benson | 287/58 R |
| 2,387,007 | 10/1945 | Buchanan | 137/636.1 |
| 2,394,363 | 2/1946 | Bynoe | 285/137 R |
| 2,579,134 | 12/1951 | Worthington | 137/492 X |
| 2,596,020 | 5/1952 | Fletcher et al. | 285/137 R X |
| 2,644,429 | 7/1953 | Waterman et al. | 137/612.1 X |
| 3,125,120 | 3/1964 | Hasbany | 137/596.2 X |
| 3,216,448 | 11/1965 | Stacey | 137/636.1 X |
| 3,304,953 | 2/1967 | Wickline et al. | 625.6 X |
| 3,315,702 | 4/1967 | Passagio | 137/625.64 |

FOREIGN PATENTS OR APPLICATIONS 203,307    12/1954    Australia ........................... 137/538

Primary Examiner—Henry T. Klinksiek
Attorney—Oberlin, Maky, Donnelly & Renner

[57] ABSTRACT

A spool valve assembly having a flow control and cam spool which cams pilot check valve members to unseated position to initiate return flow of fluid from a fluid motor to a tank, said assembly being characterized in that the pilot operated check valves are disposed in cartridges which are adjustable in the valve housing to enable accurate positioning of the cam operated pilot check valves with respect to the spool cams. The assembly herein is further characterized in that although the main check valve is opened by differential fluid pressure upon cam opening of the pilot check valve, the main check valve is prevented from closing so long as the valve spool is in operating position. The assembly herein also has means to prevent buildup of pressure in the valve chambers upstream of the cam operated check valves so that fluid leaking past the spool land at the pressure inlet is vented to the tank via the upstream chambers aforesaid. Still another characterizing feature of the invention is that the pilot operated check valves have chatter or flutter preventing means which precludes inadvertent closing of that check valve which is on the pressure side due to pressure surges or pulsations, or other sudden rise in pressure between the fluid motor and the spool valve assembly.

8 Claims, 5 Drawing Figures

Patented May 16, 1972
3,662,783
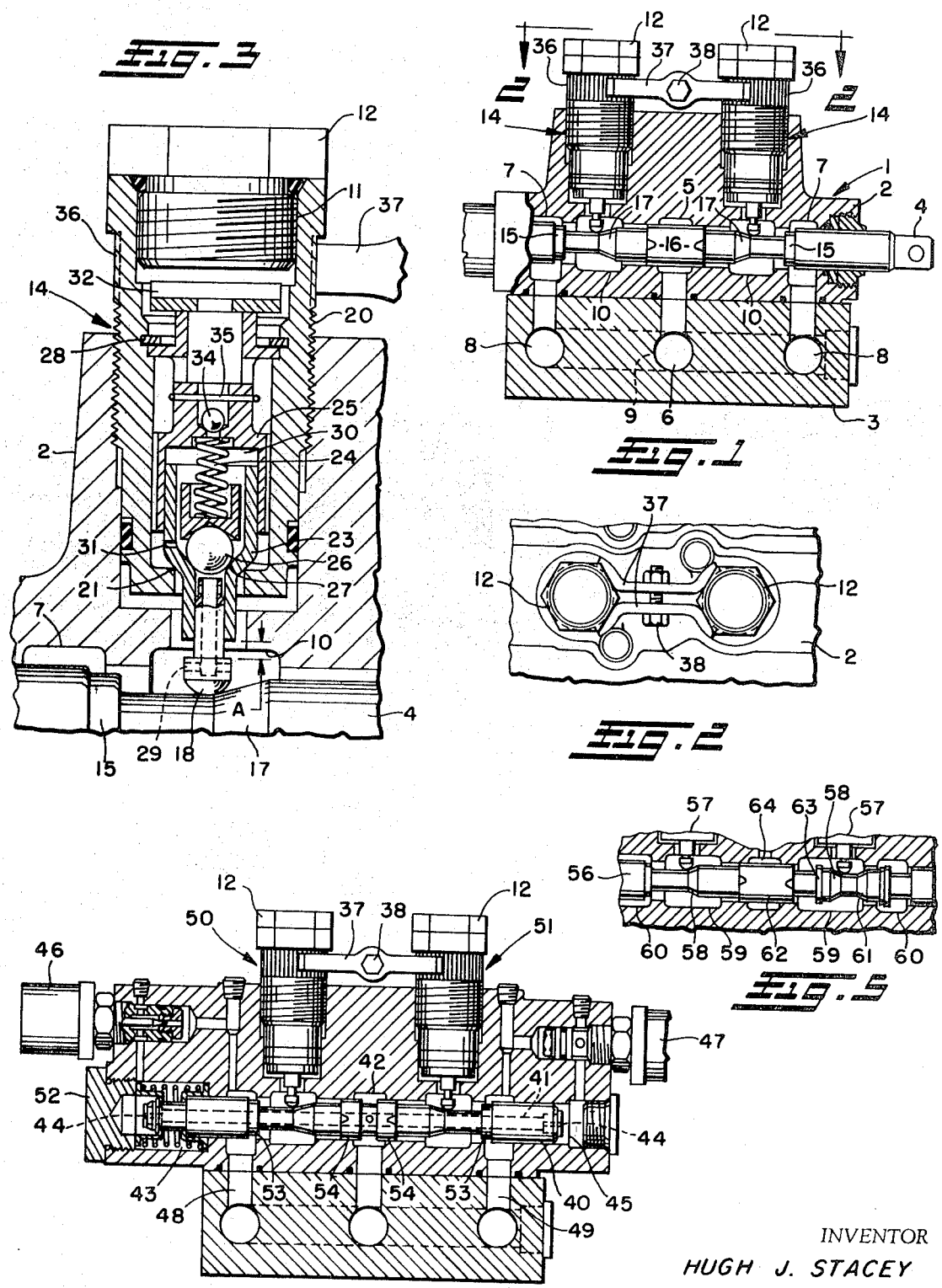
INVENTOR
HUGH J. STACEY
BY Oberlin, Maky, Donnelly & Renner
ATTORNEYS

SPOOL VALVE ASSEMBLY

BACKGROUND OF THE INVENTION

It is known to provide a spool valve assembly having a flow control and cam spool which operates pilot operated check valves which are disposed downstream of the valve spool thus to provide an assembly which eliminates leakage of fluid from a fluid motor, and which prevents downward drift of a load on the motor. See, for example the U.S. Pat. to Stacey No. 3,216,448, granted Nov. 9, 1965, wherein the location of the spool engaging portion of the pilot check valve may vary due to tolerance variations in the location of the main check valve seat in the housing, in the location of the pilot check valve seat in the main check valve with respect to the seating surface of the main check valve, and in the length of the pilot check valve from its seat to the spool engaging tip thereof. This requires that the parts be made to provide a clearance between the pilot check valve tip and the spool so as to assure seating of the pilot check valve in the main check valve. Accordingly, when the manufacturing tolerances accumulate, there may be a substantial clearance between the pilot operated check valve and the spool in the closed position of the check valve, whereby the operation of the spool will not cam the pilot operated check valve to open position to desired extent.

Furthermore, as shown in the aforesaid Stacey patent, for example, the bores in which the main check valves are movable are closed by threaded plugs which form biasing spring backup members and in addition to these threaded bores, other threaded bores are provided to constitute the motor ports for connection with the ports of a fluid motor.

SUMMARY OF THE INVENTION

Contrary to the foregoing, the present valve assembly embodies pilot operated check valve cartridges in adjustably threaded engagement in the valve housing, whereby the pilot operated check valves and main check valve may be accurately positioned with respect to the valve spool. Therefore, the locations of the main check valve seat and of the pilot check valve seat, and the length of the pilot valve operating member, are not critical and may be compensated for by adjustment.

In addition, the cartridge bodies are threaded to constitute the motor ports of the valve housing thereby avoiding the necessity of providing separate passages and threaded ports leading to the downstream side of the main check valve.

It is another object of this invention to provide a spool valve assembly which is of the closed center type but, in the event of high pressure fluid leakage past the spool land which closes the inlet port, the leaking fluid is conducted to the tank via leakage passageways so that pressure cannot build up adjacent the spool land to cause inadvertent opening of the pilot operated check valves.

It is another object of this invention to provide a spool valve assembly of the character indicated which has a float position in addition to the usual two operating positions and neutral position characterized by a four-way valve, the float position being such that both pilot operated check valves are cam opened to communicate the motor ports with each other and with the tank.

It is a further object of this invention to provide a spool valve assembly of the character indicated in which the pilot operated check valves have associated therewith anti-chatter means which prevents inadvertent closing of the pressure opened check valve due to pressure surges.

Yet another object of this invention is to provide a spool valve assembly of the character indicated in which the spool is pressure operated, solenoid operated vent valves being selectively operative to vent either end of the spool whereby higher pressure in the other end actuates the spool in desired direction.

Other objects and advantages of the present invention will appear hereinafter.

BRIEF DESCRIPTION OF THE DRAWING

FIG. 1 is a central vertical cross-section view of a spool valve assembly embodying the present invention;

FIG. 2 is a fragmentary top plan view as viewed along the line 2—2, FIG. 1;

FIG. 3 is an enlarged cross-section view of a pilot operated check valve cartridge which is adjustably mounted in the valve housing;

FIG. 4 is a cross-section view of another spool valve assembly embodying this invention, but illustrating power means for shifting the spool to desired operating positions; and FIG. 5 is a fragmentary cross-section view similar to FIG. 1, except illustrating a four-way spool valve assembly which in addition to having the usual neutral and two operating positions, has in addition a third operating position, namely, a float position.

DETAILED DESCRIPTION OF THE INVENTION

In FIGS. 1, 2 and 3, the valve housing 1 is shown as comprising two parts 2 and 3 clamped together, the part 2 having a bore therethrough in which the flow control and cam spool 4 is reciprocable, said bore being intersected by a pressure inlet passage 5 which leads to a pressure inlet port 6 in the housing part 3, and by return passages 7;7 which lead to return passages 8;8 in the housing part 3 and which passages 8;8 are joined together to form a single return port 9 which is adapted to be connected to a tank or reservoir (not shown). Adjacent the pressure inlet passage 5 are motor passages 10;10 which lead to motor ports 11;11 adapted for connection as by tube or hose fittings 12;12 with the ports of a double acting fluid motor via pilot operated check valves 14;14.

The spool 4 has stepped portions 15;15 adjacent the return passages 7;7 which provide a leakage path from the adjacent motor passages 10;10 in the event that high pressure fluid leaks past the spool land 16, whereby when the spool 4 is in neutral position as shown in FIG. 1, pressure cannot build up in either motor passage 10 and, thus, there is no danger of inadvertent opening of either pilot operated check valve 14. The spool 4 also has oppositely disposed tapered cam surfaces 17;17 which are adapted to engage either pilot valve operating member 18 depending upon which direction the spool 4 is shifted from its neutral position. Because the pilot operated valves 14 may be of the same construction only one of them has been shown in detail in FIG. 3.

Referring now to FIG. 3, the pilot operated check valve 14 comprises a cartridge body 20 having threaded engagement with the housing part 2 and is provided with a seat 21 with which a main check valve member 23 is engaged by the biasing spring 24 which is compressed between the main valve guide 25 and a pilot check valve member 26 which engages a seat 27 in the main check valve member 23, thus in turn to bias the latter into engagement with its seat 21. The guide 25 is retained in the cartridge body 20 as by means of the snap ring 28, and has flow passages through its upper end portion and defines with the cartridge body 20 flow passages around the lower end portion.

Movable in the main check valve member 23 is the pilot check operating member 18 which has a passage 29 therethrough and which, when cammed upwardly by the spool cam 17, unseats the pilot check valve member 26 to vent the chamber 30 behind the main check valve member 23 faster than fluid can be replenished thereinto via the orifice 31 whereby the predominant pressure acting upwardly on the annular area of the main valve member 23 opens the same. Furthermore, the distance A is less than the rise of the cam surface 17 whereby the main check valve member 23 is additionally prevented from closing due to pressure surge or other cause. However, in normal operation when the pilot check valve member 26 is unseated by the operating member 18, the main check valve 23 will move away from its seat 21 before the distance A between the head of the operating member 18 and the lower end of the main check valve member 23 is taken up. Accordingly, when the pilot operated check valve 26 is opened as aforesaid, return flow of fluid from the motor is initiated through the open main check valve member 23 into the motor passage 10 and adjacent return passage 7.

When the spool 4 is moved to the right, as viewed in FIGS. 1 and 3, the right-hand cam 17 opens the right-hand pilot operated check valve assembly 14 to initiate flow of return fluid from the motor into the right-hand motor passage 10 and to the tank via the adjacent return passage 7. When the spool is thus shifted to the right, the left-hand motor passage 10 is placed in communication with the inlet passage 5 whereby pressure acting upwardly on the area of the main check valve member seat 21 opens the main check valve member 23 for flow of fluid under pressure to the fluid motor through the passages around the lower end portion of guide member 25 and through the passages in the upper end portion of guide member 25 and in the orifice plate 32 which is disposed between the guide member 25 and the end of the fitting 12 which is screwed into the motor port 12 of the cartridge body 20. To assure prompt opening the guide 25 is provided with a check valve member 34 which is retained by a cross pin 35, whereby fluid in the chamber 30 may readily escape not only through the orifice 31 but also through the passage opened by the check valve member 34. Now, should there be a sudden rise or surge in pressure due to increased load on the fluid motor, for example, the check valve member 34 will close to prevent such pressure from rapidly reaching the chamber 30 and thus the main check valve member 23 will not be slammed shut by such surge. This also eliminates chatter or flutter.

Adjacent the upper end of each cartridge body 20 are provided axial serrations 36 which are engaged by screw actuated clamping members 37 and, as apparent, when the screw means 38 is loosened, the cartridge body 20 may be accurately adjusted to position the parts relative to the spool 4. When the cartridges 14 have been adjusted, retightening of the screw means 38 will hold them in their adjusted positions.

Referring now to FIG. 4, the spool 40 has a passage 41 therethrough which at its middle communicates the pressure inlet passage 42 with chambers 43 and 45 at the ends of the spool 40. The passage 41 has orifices 44 at its ends and the chambers 43 and 45 are closed by solenoid operated vent valves 46 and 47 whereby upon energization of the solenoid of either vent valve 46 or 47 opens communication between the associated chamber 43 or 45 and the adjacent return passage 48 or 49, whereby the pressure in the vented chamber 43 or 45 will be less than in the other unvented chamber due to pressure drop across the orifice 44 at the vented chamber. Thus, the high fluid pressure in the unvented chamber will urge the spool 40 toward the vented chamber, to actuate the desired pilot operated check valve 50 or 51. The mechanism 52 shown at the left-hand end of the spool is a conventional form of spring mechanism for centering the spool 40 in its neutral position and as in FIG. 1, the spool 40 is provided with relieved portions 53 to provide communication between the adjacent motor and return passages to prevent buildup of pressure in the motor passages due to leakage of fluid past the land 54 which closes the inlet passage 42.

With reference to FIG. 5, the valve construction is generally similar to that in FIG. 1, except that said valve is provided with a float position in which as apparent, when the spool 56 is shifted first to the left, only the left-hand pilot operated check valve assembly 57 is opened by the left-hand cam 58 to establish return flow from the motor to the tank via the left-hand motor and tank passages 59 and 60. When the spool 56 is shifted further to the left from this operating position, a cam 61 at the right-hand end of the spool opens the right-hand pilot operated check valve assembly 57 so that both ends of the motor are communicated with the return passages 60. The lands 62 and 63 are effective to prevent communication of the inlet passage 64 with either motor passage 59, whereby the piston in the motor may float in either direction, usually in the direction of a load acting thereon. If desired, an adjustable restrictor valve may be provided in the inlet passage 64 upstream of the spool land 62 to control the rate of flow of fluid to the motor via the pilot operated check valve 57 which is at that time opened to the inlet passage 64.

I, therefore, particularly point out and distinctly claim as my invention:

1. A valve assembly comprising a housing having a bore intersected axially therealong by inlet, return, and motor passages adapted for connection with a fluid pressure source, a tank, and a fluid motor respectively; a valve member movable in said bore to selectively communicate said motor passage with said inlet passage or with said return passage; a check valve assembly in said motor passage opened by fluid pressure when said valve member is moved to communicate said inlet passage with said motor passage; said check valve assembly and said valve member having cooperating cam means operative to open said check valve assembly when said valve member is moved to communicate said motor passage with said return passage; and adjusting means adjustably securing said check valve assembly in said housing to effect predetermined degree of actuation of said check valve assembly by said cam means upon movement of said valve member to the last-mentioned position; said check valve assembly comprising a body having a main check valve seat, a main check valve member movable in said body into and out of engagement with said seat and defining with said body a chamber having restricted communication with the portion of the motor passage which is on the outlet side of said main check valve member, said main check valve member having a pilot check valve seat, a pilot check valve member actuated by said cam means to a position out of engagement with said pilot check valve seat to vent said chamber to said tank passage via the portion of the motor passage on the inlet side of said main check valve member faster than fluid can be replenished into said chamber via said restricted communication whereby higher pressure acting on the outlet side of said main check valve member than on the inlet side thereof and in said chamber moves said main check valve member out of engagement with the main check valve seat.

2. The valve assembly of claim 1 wherein another check valve means in said body, in addition to said restricted communication, vents said chamber to the outlet side of said main check valve member for rapid opening of the latter when the inlet side of the motor passage is communicated with said inlet passage, said another check valve means preventing rapid buildup of pressure in said chamber in the event of pressure surges or pulsations in the portion of the motor passage on outlet side of said main check valve member whereby to decrease chatter or flutter of the latter.

3. The valve assembly of claim 1 wherein said cam means comprises a frusto-conical cam surface on said valve member, and a cam follower engaging said pilot check valve member and said cam surface to move said pilot check valve member out of engagement with said pilot check valve seat upon movement of said valve member to a position communicating said motor passage with said return passage.

4. The valve assembly of claim 3 wherein said adjusting means enables adjustment of said body in said housing so that said main check valve member may be engaged by said cam follower to move said main check valve member away from its seat upon movement of said valve member to a position communicating said motor passage with said return passage.

5. The valve assembly of claim 3 wherein said adjusting means enables adjustment of said body, and thus said pilot check valve member, in said housing so that said pilot check valve member is moved a predetermined distance away from its seat upon movement of said valve member to a position communicating said motor passage with said return passage.

6. A valve assembly comprising a housing having a bore intersected axially therealong by an inlet passage for connection with a fluid pressure source, a pair of motor passages straddling said inlet passage for connection with a double-acting fluid motor, and a pair of return passages straddling said motor passages; a valve spool in said bore movable from a neutral position blocking communication of said motor passages with said inlet and return passages to operating positions selectively communicating said motor passages with inlet and return passages to control the direction of actuation of such fluid motor; a pilot operated check valve assembly in each motor passage arranged to be opened by fluid pressure when its motor passage is communicated with said inlet passage to permit flow of fluid to such motor, and to be opened by cam means on said spool when its motor passage is communicated with the adjacent return passage; each check valve assembly comprising a body adjustably secured in said housing for adjustment toward or away from said spool and having a seat; a main check valve member movable in said body into and out of engagement with said seat to permit flow of fluid through said motor passage to or from the motor as aforesaid; said main check valve member having a pilot check valve member seat and defining with said body a chamber which has restricted communication with said motor passage downstream of said body seat; a pilot check valve member engaged with said pilot seat and movable into and out of engagement with said pilot seat to vent said chamber to the motor passage upstream of said body seat faster than fluid can be replenished into said chamber through such restricted communication whereby higher fluid pressure downstream of said body seat moves said main check valve member away from said body seat for return flow of fluid from the motor through said motor passage when it is communicated with the adjacent return passage; each said cam means comprising a frustoconical cam surface on said spool; and a cam follower engaging said pilot check valve member and said cam surface to move said pilot check valve member out of engagement with said pilot seat upon movement of said spool to communicate said motor passage with the adjacent return passage; the adjustment of each body in said housing varying the distances between said body and pilot seats and said cam surface to insure desired opening of said pilot check valve member by said cam follower and to enable engagement of said cam follower with said main check valve member to move the latter out of engagement with said body seat after the pressure in said chamber has been decreased by opening of said pilot check valve member.

7. The valve assembly of claim 6 wherein the ends of said spool and said housing define chambers having restricted communication with said inlet passage; and wherein solenoid operated valves are selectively operative to vent either chamber to the adjacent return passage whereby fluid pressure in the unvented chamber urges said spool from neutral position to an operating position.

8. The valve assembly of claim 6 wherein each body has an adjustable threaded connection with said housing; wherein each body has an axially serrated portion therearound; and wherein a screw actuated clamp mechanism engages said serrated portions to lock said bodies in their respective adjusted positions.

* * * * *